(12) United States Patent
Raal

(10) Patent No.: US 6,394,641 B2
(45) Date of Patent: May 28, 2002

(54) PREPARATION OF STANDARD GAS MIXTURES

(75) Inventor: Johan David Raal, Kwa Zulu Natal (ZA)

(73) Assignee: Technology Finance Corporation (PTY), Ltd., Sandton (ZA)

( * ) Notice: Subject to any disclaimer, the term of this patent is extended or adjusted under 35 U.S.C. 154(b) by 0 days.

(21) Appl. No.: 09/828,944

(22) Filed: Apr. 10, 2001

(30) Foreign Application Priority Data

Apr. 12, 2000 (ZA) .............................................. 00/1843

(51) Int. Cl.$^7$ .......................... B01F 15/02; B01F 15/04; B01F 7/16; B01L 11/00; G05D 11/00
(52) U.S. Cl. ................................ 366/155.1; 366/190.4; 366/160.5; 422/99; 422/103; 137/88
(58) Field of Search ........................... 366/160.1, 160.2, 366/160.3, 160.4, 160.5, 155.1, 241, 279, 292, 293; 422/99, 103, 111, 112, 225, 306; 222/6, 134, 309; 137/88; 92/179; 73/864, 62

(56) References Cited

U.S. PATENT DOCUMENTS

| | | | | | |
|---|---|---|---|---|---|
| 3,158,072 A | * | 11/1964 | Detrez | .......................... | 92/179 |
| 5,147,612 A | * | 9/1992 | Raal | .............................. | 422/99 |
| 5,467,899 A | * | 11/1995 | Miller | .......................... | 222/309 |
| 5,544,674 A | * | 8/1996 | Kelly | ........................... | 137/114 |
| 5,996,854 A | * | 12/1999 | Raal | .............................. | 222/309 |

* cited by examiner

Primary Examiner—Tony G. Soohoo
(74) Attorney, Agent, or Firm—Young & Thompson

(57) ABSTRACT

Apparatus for the preparation of gas mixtures includes cylinder which is divided into two chambers by means of a fixed central barrier. This barrier has a central orifice for receiving a rod which has central portion of diameter corresponding with the diameter of the orifice. The rod has end portions which pass through end plates of the cylinder and these end portions have a small diameter than that of the central portion, the diameters of the end portions being equal. A valved passage for the gases of either chamber to be transferred to the other chamber is provided in the barrier and a stepper motor is used to move the rod over small distances; with means to introduce or withdraw gas from either chamber.

8 Claims, 2 Drawing Sheets

US 6,394,641 B2

PREPARATION OF STANDARD GAS MIXTURES

FIELD OF THE INVENTION

Figure 1:
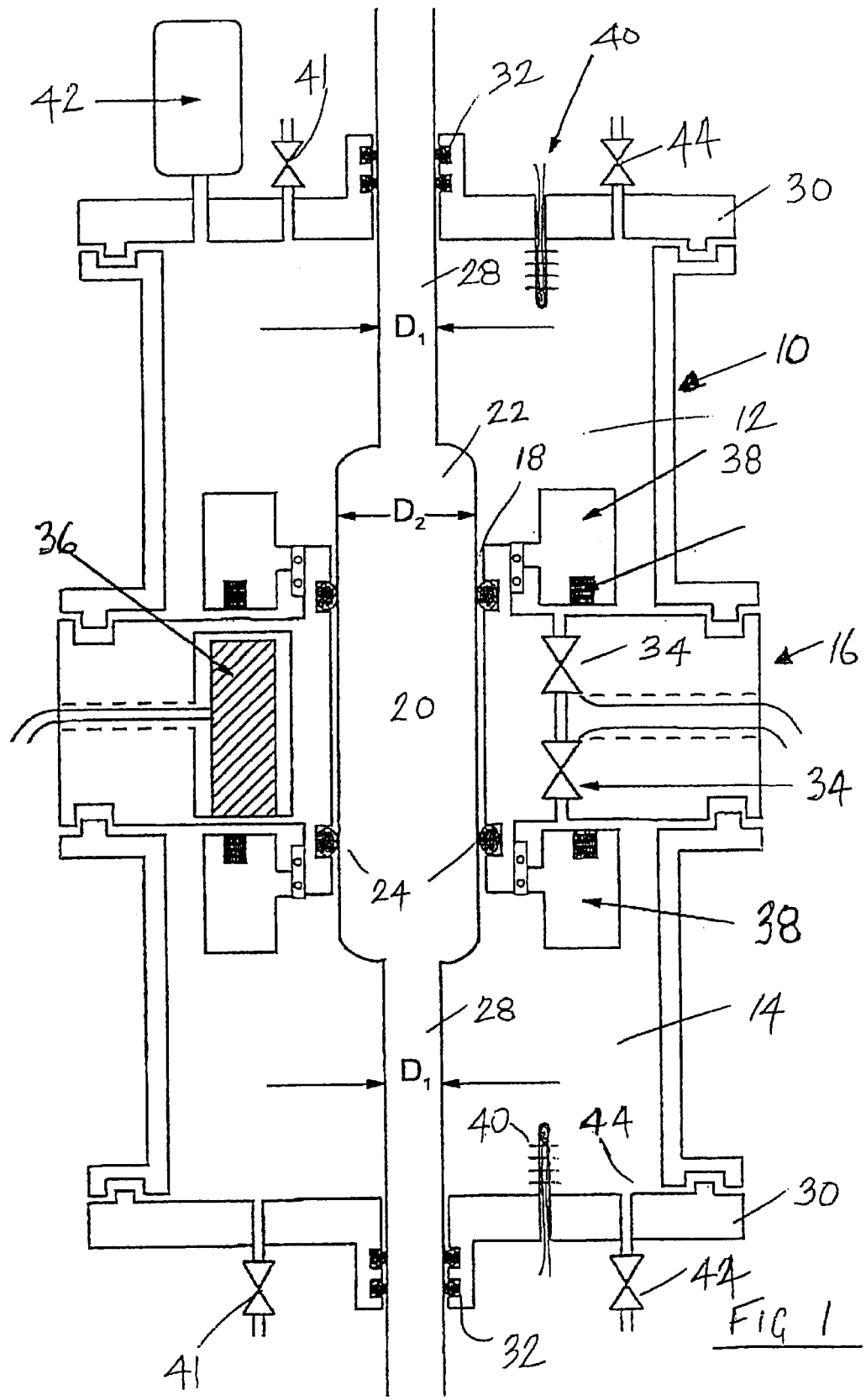

This invention relates to apparatus for the preparation of standard gas mixtures.

BACKGROUND OF THE INVENTION

In my RSA Patent 90/8032, U.S. Pat. No. 5,147,612, is a description of apparatus for preparing accurate standard mixtures particularly for calibration of gas chromatographs (GCs), the apparatus comprising a closed cylinder, a piston sealingly movable in the cylinder and which defines a first and second chamber, piston rods of exactly the same diameter on either side of the piston and extending sealingly through the end walls of the cylinder, the piston having a valved passage therethrough so that gas may be moved from one chamber to the other by moving the piston a calculated distance corresponding to the volume of gas required to be moved, and means for introducing or withdrawing gas from either chamber.

Although that apparatus has been found to be very useful for most gas mixture ratios, the large surface area of the piston requires that, for the preparation of very dilute gas mixtures, the tiny movement required for the piston is difficult to control and measure accurately.

It is an object of the present invention to provide an apparatus which is not only of simpler construction than that of the previous invention but which also allows minute volumes of gas to be moved from one chamber to the other, i.e. It is capable of making accurately measurable mixtures down to vanishingly small concentrations.

THE INVENTION

According to the invention an apparatus for the preparation of gas mixtures includes a cylinder divided into chambers by a fixed or movable barrier having a central orifice adapted to receive, in sealingly slidable relationship, a rod having a central portion of diameter corresponding with the orifice and having end portions which pass sealingly through end plates of the cylinder, the end portions having either a smaller or larger diameter than the central portion, a valved passage through the barrier; which can also be installed in the sliding rod, stirring means in each chamber, means to accurately move the rod or the dividing barrier at least over small distances, and means to introduce or withdraw gas from either chamber.

The difference in diameter between the central portion of the rod and the end portions is proportional to the volume of gas displaced from one chamber to the other per unit of length of rod moved.

The end portions have exactly equal diameters so that if the rod is moved upwards or downwards there is no change in the total interior volume of the apparatus. The volume of gas injected from one compartment into another is thus proportional purely to the displaced volume of the rod, but may have diameters of a selected ratio for desired sensitivity. The rod diameters are unrelated to the internal diameter of the cylinder.

The central portion seals with the orifice by means of O-rings and so too do the end portions in the end plates of the cylinder. As mentioned above the barrier includes a valved passageway and in a refinement of the invention this passageway is provided with a pair of valves with their sealing points located respectively as near to the two extremities of the passageway as possible. This arrangement avoids requirement to account for the "dead volume" when using a single valve. The passageway is filled with gas from one of the chambers by evacuating the chamber with the relevant valve in the passageway open, and then allowing the gas to fill the passageway through the open valve up to the sealing point of the second valve. The opposing chamber is filled with a different gas with the communicating valve on its side closed at its sealing point very near the barrier/chamber interface. Movement of the sliding rod with the valve opening into the second chamber now opened, will displace gas from the first chamber into the second chamber without first having to fill or displace any "dead volume" in the passageway between the two chambers. To displace gas from the top to the bottom chamber, the reverse of the above operation is used. This will be explained in more detail when referring to the drawings.

EMBODIMENTS OF THE INVENTION

Three embodiments of the invention are described below with reference to the accompanying drawings, which are sectional side views of alternative forms of the invention.

Referring first to FIG. 1, the apparatus comprises a cylinder 10 in two halves 12, 14. A barrier 16 is interposed between the two halves and this barrier has a central orifice 18 through which a rod 20 passes. This rod has a central portion 22 which is slidable in the orifice and seals therein by means of )O-rings 24 top and bottom; and end portions 28. Both the end portions have equal diameters which are smaller than that of the central portion. The end portions extend through the end plates 30 and seal therein with O-rings 32. An alternative construction of the rod in which the central portion 22 is smaller than the two end portions 28 is an alternative configuration and will function in a similar way.

The barrier 16 has a pair of miniature solenoid valves 34 which are joined to constitute a passageway between the two chambers 12,14. The barrier also includes solenoid coils 36 which control the stirrers 38 in the two chambers 12,14. Each chamber has a temperature sensor 40 and a relief valve 41 so that the gases in each chamber can be vented to atmospheric pressure. The chambers also include inlet/outlets 44 for filling or evacuating the chambers 12 and 14, and a pressure sensor 42 is mounted in the end plate 30 of chamber 12.

Figure 2:
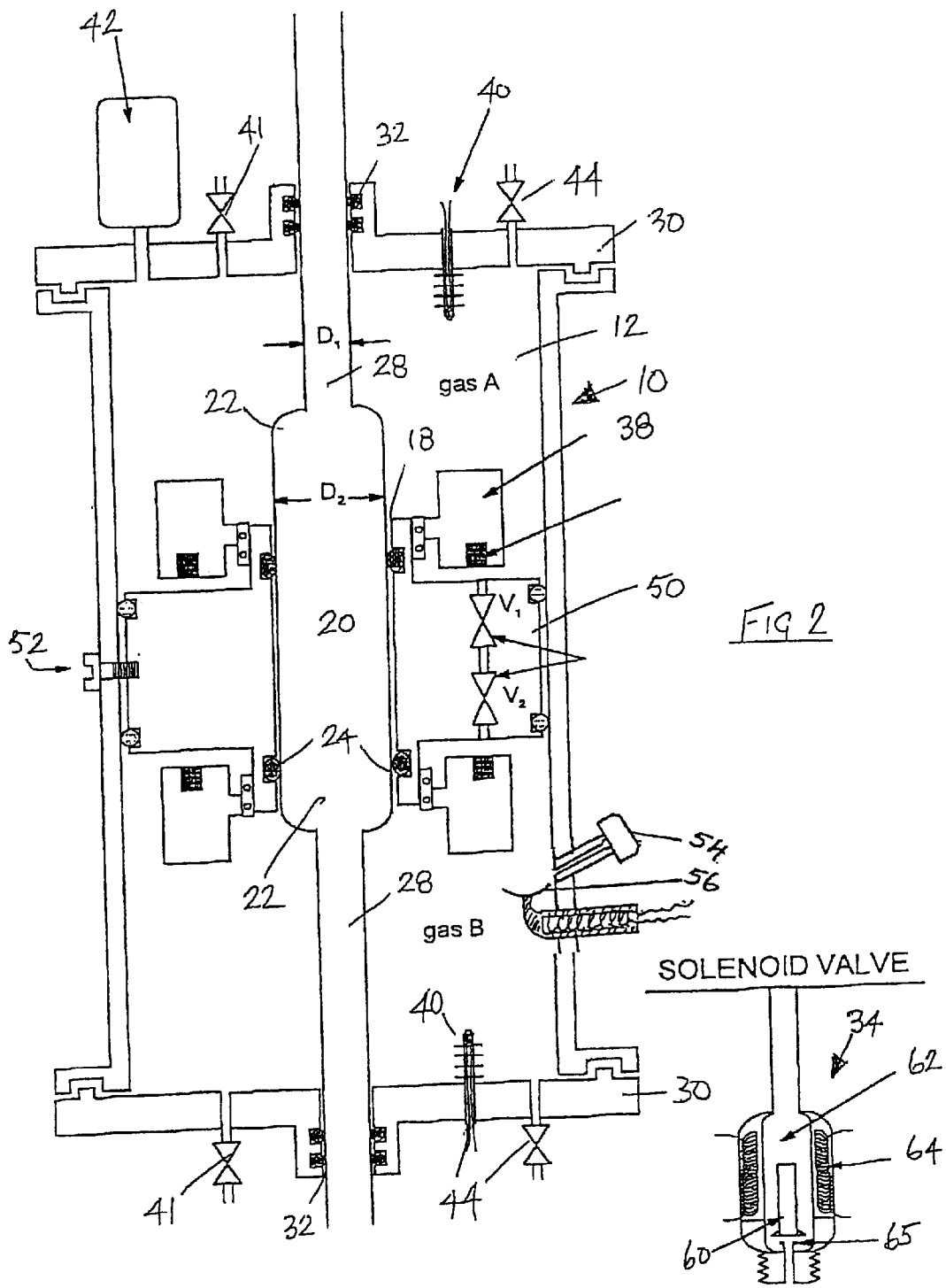

In FIG. 2 the cylinder includes a barrier 50 which is located in position by means of screws or bolts 52. Otherwise the construction is the same as in FIG. 1 and similar reference numbers are used to indicate the same parts.

A sample septum 54 is provided (see FIG. 2) for the introduction of a volatile liquid such as benzene, which is discharged on to the spoon 56 which is adapted to be heated to vapourise the liquid. In this way, minute amounts of a volatile liquid (e.g. ppm.) can be mixed with the major volume of gas in the lower chamber.

A detailed drawing of a solenoid valve is shown separately to include a piston 60 in a passage 62 and coils 64 provided for movement of the piston. In the position shown the space in the passage is filled with the gas from the relevant chamber so there is no dead space. The valve seals at point 65.

In operation the chamber 12 is filled with gas A and allowed to reach atmospheric pressure by virtue of the relief valve, the upper solenoid valve in the barrier 16 being closed. The chamber 14 is then filled with gas B while the lower solenoid valve 34 is open. Thus the gas B fills the passageway up to the sealing point of the upper valve. If the upper valve is then also opened and the rod moved downwards, the gas B will enter the chamber 12 without having to fill any dead volume. Thus, no correction is required.

When a very dilute mixture is to be formed in the chamber 14, the reverse procedure is adopted so that gas A from chamber 12 is first made to fill the passageway up to the sealing point of the lower valve. For extremely small concentrations (e.g. ppm) of gas A in gas B, so-called "double-dilution" procedure can be used. In this method a very dilute mixture of A in B is formed in the bottom chamber 14. Chamber 12 is then evacuated and filled with pure gas B. Small amounts of the very dilute mixture of A in B in the lower chamber (14) can then be propelled into pure gas B in the top chamber (12) by stepper motor controlled downward movement of the rod 20 in small increments.

Very small concentrations of a liquid C in gas B can similarly be made first injecting a small amount of C through the sample septum onto the heated spoon 56 in chamber 14 containing gas B. After homogenization with the stirrers, small amounts of this gas-vapour mixture can then be propelled into pure gas B in the top chamber 12 by stepper motor controlled downward movement of the rod 20.

Suitable choice of ratios of diameters of the end portions and the central portion of the rod ensure that the sensitivity of the apparatus can be tailored to the desired purpose—small differences in diameters providing extreme accuracy as would be required to prepare mixtures of a few ppm. concentrations. It is also possible to have a sliding rod with the end diameters larger than that of the middle portion, which then requires an upward movement of the rod to displace gas from the bottom to the top chamber.

The advantages of the present invention having regard to the previous invention are as follows:

1. The internal diameter of the cylinder need not be uniform as is the case of 90/8032 because the present invention does not use a movable piston to seal and separate the two chambers.
2. The cylinder and rod diameters are unrelated and can be varied to any arbitrary ratio.
3. The use of twin solenoid valves connected in series obviates the small "dead volume" calculating problem.
4. It is relatively simple to machine the rod to the required degree of uniformity.
5. Smaller O-rings may be employed to seal the sliding rod thereby reducing friction so that a smaller stepper motor can be used. Still further, the O-rings may be arranged to present a very limited surface area to the gases
6. Much greater sensitivity can be obtained. The variations of D1 and D2 can be infinitely changed to suit the particular application. If D1 is changed, the seals 32 will have to be changed. This may mean having to provide two or more end plates 30 with different orifice sizes to accommodate different D1; or a number of inserts 32 of differing diameters. The same consideration will also be available in respect of the relevant structure in the barrier to accommodate differing D2. In the limit, as D1–D2 an infinite rod movement will produce zero concentration of A in B or gas B in A.

Such a capability is possessed by no other similar equipment.

7. It is easier to bring electrical leads for stirrers and solenoid valves out of the equipment through the fixed barrier.
8. The top and bottom compartments need not necessarily be cylindrical and can be of arbitrary shape and of different diameters, for example, when they are separated by a barrier as in FIG. 1.
9. The size of the stirrers 38 may be enlarged, which is not possible with the previous apparatus. The top stirrer can be extended upwards for example, and the bottom one downwards to near the sealing end plates, since the stirrers are no longer attached to a moving piston.

What is claimed is:

1. An apparatus for the preparation of gas mixtures includes a cylinder divided into chambers by a barrier having a central orifice adapted to receive, in sealingly slidable relationship, a rod having a central portion of diameter corresponding with the orifice and having end portions which pass sealingly through end plates of the cylinder, a valved passage through the barrier; stirring means in each chamber, means to move the rod at least over small distances, and means to introduce or withdraw gas from either chamber.

2. Apparatus according to claim 1 in which the end portions have the diameters which are either smaller or larger than the central portion.

3. Apparatus according to claim 1 in which the end portions have diameters which are of a selected ratio.

4. Apparatus according to claim 1 in which the central to end portions of the rod seal with corresponding orifices by means of O-rings.

5. Apparatus according to claim 1 in which the barrier includes a valved passageway.

6. Apparatus according to claim 5 in which the passageway includes a pair of valves with their sealing points located respectively as near to the two extremities of the passageway as possible.

7. Apparatus according to claim 5 in which the passageway is filled with gas from one of the chambers by evacuating the chamber with the relevant valve in its open position, and then allowing gas to fill the passageway through the open valve up to the sealing point of the second valve, opening the valve into the second chamber while moving the rod to displace gas from the first chamber into the second chamber.

8. Apparatus according to claim 1 in which the valves are solenoid valves.

* * * * *